United States Patent [19]

Myers

[11] Patent Number: 5,592,606
[45] Date of Patent: Jan. 7, 1997

[54] METHOD AND APPARATUS FOR STORAGE AND DISPLAY OF HIERARCHALLY ORGANIZED DATA

[76] Inventor: Allen Myers, P.O. Box 2348, Ames, Iowa 50010

[21] Appl. No.: 100,569

[22] Filed: Jul. 30, 1993

[51] Int. Cl.⁶ .................................................. G06F 3/14
[52] U.S. Cl. .................................................. 395/356
[58] Field of Search .......................... 395/155, 157, 395/159, 325, 575, 156, 158, 160, 161; 364/424.07, 401, 422, 571.02, 413.01; 345/87, 74, 174; 379/96

[56] References Cited

U.S. PATENT DOCUMENTS

| | | | |
|---|---|---|---|
| 2,561,763 | 7/1951 | Waters et al. | 73/228 |
| 2,805,574 | 9/1957 | Jackson, Jr. et al. | 73/228 |
| 3,593,720 | 7/1971 | Botterill | 130/27 |
| 3,606,745 | 9/1971 | Girodat | 56/20 |
| 3,939,846 | 2/1976 | Drozhzhin et al. | 130/27 |
| 4,261,039 | 4/1981 | Baker et al. | 395/105 |
| 4,275,456 | 6/1981 | Tanaka et al. | 395/575 |
| 4,407,380 | 10/1983 | Elder | 177/145 |
| 5,023,905 | 6/1991 | Wells et al. | 379/96 |
| 5,036,317 | 7/1991 | Buzak | 345/74 |
| 5,077,553 | 12/1991 | Buzak | 345/87 |
| 5,260,875 | 11/1993 | Tofte et al. | 364/424 |
| 5,282,389 | 2/1994 | Faivre et al. | 73/861 |
| 5,305,197 | 4/1994 | Axler et al. | 364/401 |

FOREIGN PATENT DOCUMENTS 1506329  9/1975  Germany.

OTHER PUBLICATIONS

Micro-Trak Systems, Inc., "Graintrak™", 1994, 4 pages, Mankato, MN.

*Primary Examiner*—Mark R. Powell
*Assistant Examiner*—Ruay Lian Ho
*Attorney, Agent, or Firm*—Kent A. Herink; Davis, Brown, Koehn, Shors & Roberts, P.C.

[57]  ABSTRACT

A method and apparatus for storing and accessing a large amount of hierarchally organized data obtained by a yield monitor for agricultural harvesters. Data can be collected for any number of fields, each containing any number of loads. After the data has been collected, any load data value or field total value can be displayed by first selecting either the field or load level of the hierarchy, and then moving between fields or loads using up and down arrow keys on a keypad. A data display is divided into multiple partitions, one for displaying the selected field number, or a selected load number within the selected field, and two other partitions for displaying data recorded or computed for the selected field or load. Additional keys associated with these displays allow selection of many alternate data values for each display partition.

14 Claims, 4 Drawing Sheets

METHOD AND APPARATUS FOR STORAGE AND DISPLAY OF HIERARCHALLY ORGANIZED DATA

FIELD OF THE INVENTION

The present invention relates to means for storing and providing access to a large amount of data which is organized in a hierarchal manner, from a very simple operator interface. More specifically, the present invention relates to means for storing data on field areas, grain weights and crop yields which are measured during harvesting of grain, for a large number of fields which are divided into multiple parts represented by loads of grain within each field.

BACKGROUND OF THE INVENTION

Monitors for agricultural equipment which have the capability to record and store multiple levels of measured data have existed for some time. An example of such a monitor is the Acu-Grain GMS-3, which can store three levels of totals: Load, Field and Total. These levels represent the mount of grain measured from the most recently harvested Load, the mount of grain accumulated in the: most recently harvested Field, and the total amount of grain accumulated since the Total counter has been cleared. The Field value may be the sum of several Load values and the Total value may be the sum of several Field values.

However, a disadvantage of this type of data storage system is that only one value for each level can be stored. When it is desired to record a new Load, Field or Total value, the previous value must be cleared from the monitor, and is lost unless it is recorded with other means, such as manually writing it in a notebook.

Systems for recording large mounts of data, such as from many crop variety test plots, have utilized portable computers with a keyboard or pointing device for operation of the computer. However, the numerous operator actions required to operate a computer are undesirable when operating agricultural machinery, since the operator is already performing many other operational tasks.

Whatever the precise merits, features and advantages of these types of data storage methods and devices, it will be seen that none of them provides all of the objects of the present invention.

SUMMARY OF THE INVENTION

An object of the present invention is to provide new and novel means for recording data representing two or more hierarchal levels.

Another object of the present invention is to provide means for accessing hierarchally organized data with a very simple operator interface.

A further object of the present invention is to provide an operator interface which is practical for use by an operator of agricultural equipment.

A further object of the present invention is to provide means for storing and accessing data representing grain mass or volume, area and crop yield for multiple fields, each consisting of multiple loads.

The foregoing objects of the present invention are provided by a system including a monitor unit having a display divided into two or more portions, where one portion of the display indicates which part of the hierarchally organized data is selected, and the other portion of the display shows data which has been recorded or computed for the selected part of the hierarchy.

A simple keypad is provided which has keys for selecting the level of the hierarchy which is to be displayed, such as Field or Load for application to a grain harvester. The keypad also has keys for moving between consecutively stored data groups on any of the hierarchal levels. The keypad also has keys for selecting which data values are displayed for the selected hierarchal data group.

A memory device is provided and is partitioned into data blocks for storage of data that is measured or calculated for each individual unit of the lowest level of the hierarchy. Each data block is an individual data group which is identified as being part of a larger data group representing an entity on the next higher level of the hierarchy, allowing a computing device to calculate total data values for data groups at any level of the hierarchy.

A yield monitor for a grain harvester is provided with a two line display, where one of the display lines is used to indicate the Field, or the Load within a Field, which is selected for data display. The other line of the display is divided into a left and a right portion, allowing simultaneous display of two data values for the Field or Load which is selected for display. Selection of the Field or the Load level of the hierarchy is obtained by pressing either a key named FIELD or a key named LOAD. Moving between consecutively stored Field or Loads is accomplished by pressing either an Up Arrow or a Down Arrow key which are associated with the FIELD and LOAD keys. Selection of the data displayed on the two halves of the other display line is obtained by pressing keys labeled with names representing the value to be displayed, such as WEIGHT, AREA or YIELD.

BRIEF DESCRIPTION OF THE DRAWINGS AND FIGURES

Figure 1:
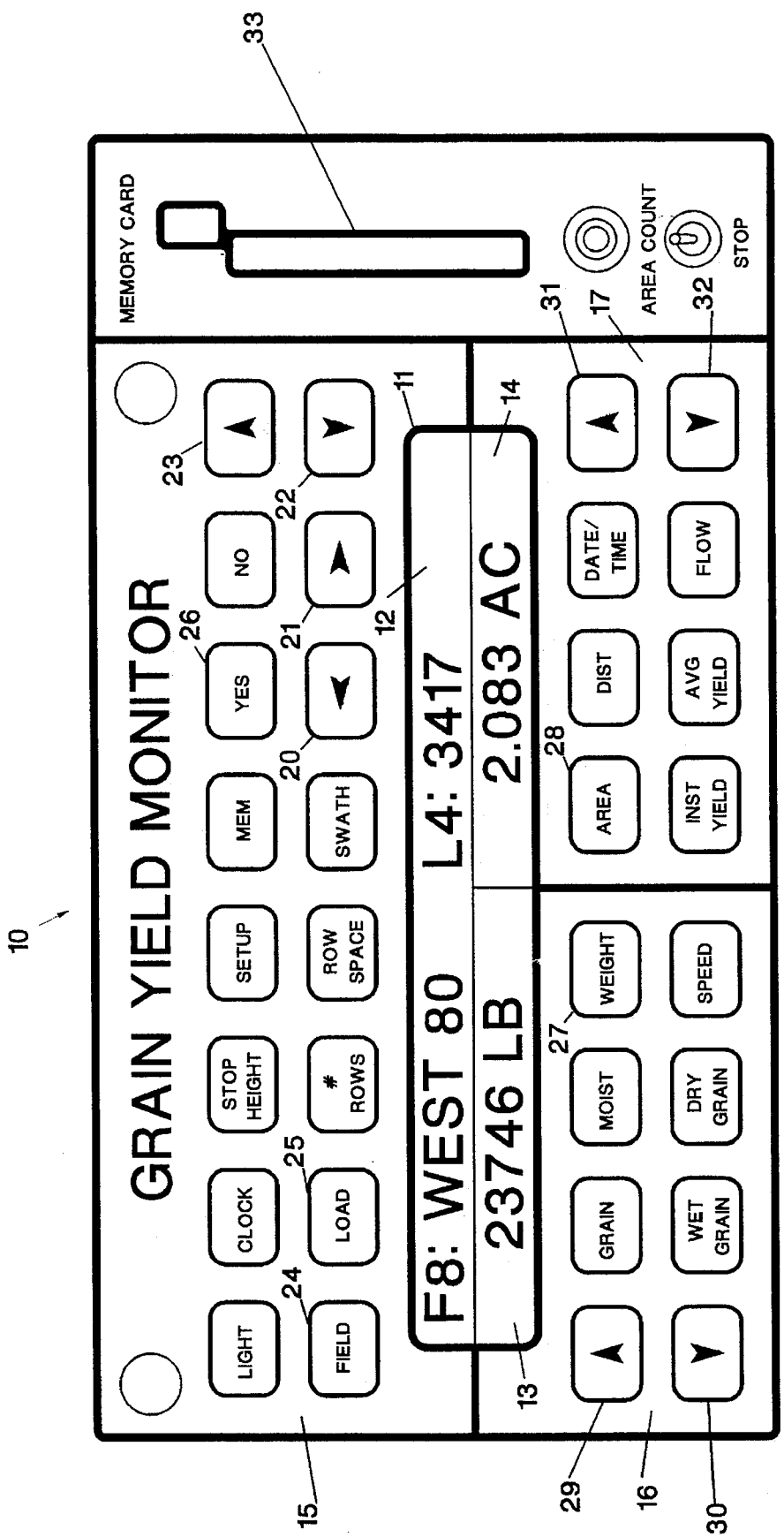
FIG. 1 is a face view of the front panel of a yield monitor for grain harvesters which incorporates the present invention, with the monitor displaying data for a particular Load within a Field.
Figure 2:
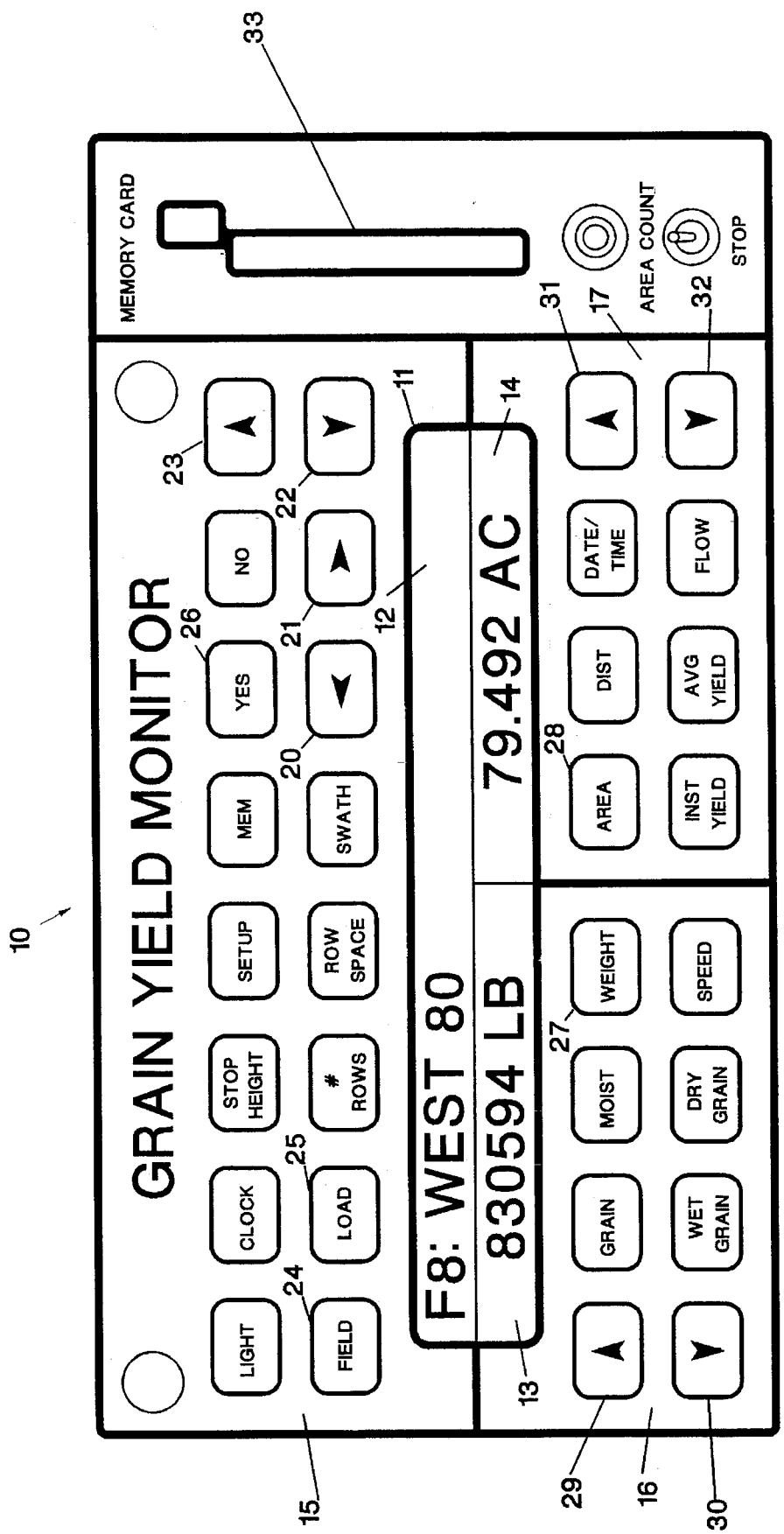
FIG. 2 is another face view of the monitor of FIG. 1, but with the monitor selected to display values representative of an entire Field.

Table 1 is a portion of a typical printout of hierarchal data accumulated by the monitor of FIGS. 1–2.

DETAILED DESCRIPTION OF THE INVENTION

Co-pending U.S. patent application Ser. No. 07/716,293, filed Jun. 17, 1991, discloses means for measuring grain mass flow rate on a harvester. Monitor unit 10 of FIG. 1 can be used with this or with other means for measuring grain flow, grain mass or grain volume on a harvester.

Referring first to FIG. 1, display 11 of monitor 10 is divided into three distinct display areas, upper display area 12, lower-left display area 13 and lower-right display area 14. The data displayed in each of these display areas are controlled by the groups of keys adjacent to each display area. Upper display area 12 is controlled by upper key group 15, consisting of of sixteen keys. Lower-left display area 13 is controlled by lower-left key group 16, consisting of eight keys, and lower-right display area 14 is controlled by lower-right key group 17, consisting of eight keys.

Upper display area 12 indicates that Load 4, indicated by L4:, of Field 8, indicated by F8:, is selected for display. The alphanumeric characters following F8: and L4: are names which have been entered by the harvester operator with the four arrow keys 20, 21, 22 and 23 of upper key group 15. Alphanumeric characters are entered by moving the underline cursor which is under the colon after L4 into one of the areas provided for entering names, using Left and Right Arrow keys 20 and 21 to move the cursor left or right, and subsequently using Up and Down Arrow keys 23 and 22 to scroll through a sequence of available alphanumeric characters.

The Load level of the hierarchy shown in FIG. 1 is selected by pressing LOAD key 25. When the Load level of the data hierarchy is selected, the numbers and names for both the selected Field and Load are displayed on upper display area 12, the data displayed on lower display areas 13 and 14 represent data values for the particular Load number of the Field number displayed on upper display area 12, and pressing Up Arrow key 23 causes the Load number to increase by one while pressing Down Arrow key 22 causes the Load number to decrease by one.

FIG. 2 shows the face of the monitor after FIELD key 24 is pressed to select display of Field totals or averages. When the Field level of the data hierarchy is selected, the number and name for only the selected Field is displayed on upper display area 12, the data displayed on lower display areas 13 and 14 represent total data values for the particular Field number displayed on upper display area 12, and pressing Up Arrow key 23 causes the Field number to increase by one while pressing Down Arrow key 22 causes the Field number to decrease by one.

When monitor 10 has been cleared of all data, only one Field, F1:, and only one Load, L1:, exist. As grain is harvested, the data recorded and computed by monitor 10 is accumulated into a data block partition of a memory device for Load I of Field 1. When it is desired to start a new Load in Field 1, the operator presses Up Arrow key 23 while the Load level of data is selected. Since Load 2 has not been created, the monitor cannot find a data block in memory for Load 2 of Field 1, and the monitor displays the message START NEW LOAD? on upper display area 12. Pressing YES key 26 will cause the monitor to start Load 2 of Field 1 by assigning an unused data block. Pressing any other key will cause the monitor to return to Load 1. Similarly, to start Field 2, the operator presses FIELD key 24 to select the Field level of the hierarchy, and then presses Up Arrow key 23, causing the monitor to display START NEW FIELD? on upper display area 12. A new Field is started by immediately pressing YES key 26. In this manner, any number of Fields, each with any number of Loads, can be created for collecting data in a hierarchal manner.

After numerous Fields and Loads have been created and data has been collected in data blocks for each individual load, any of the Fields or Loads can be accessed by moving up or down within existing Field and Load numbers using Up and Down Arrow keys 23 and 22. Selecting the Field level with the FIELD key allows moving between existing Fields, while selecting the Load level with the LOAD key allows moving between existing Loads. The messages START NEW FIELD? and START NEW LOAD? are displayed only when the operator attempts to advance beyond the highest existing Field number or the highest existing Load number within the currently selected Field.

The data values which are displayed on lower display areas 13 and 14 are selected by pressing keys in lower key groups 16 and 17. For example, pressing WEIGHT key 27 causes lower-left display area 13 to display the pounds of grain measured in the selected Field or Load, while pressing AREA key 28 causes lower-right display area 14 to display the acres of field area measured in the selected Field or Load, as shown in FIGS. 1 and 2.

Arrow keys 29 and 30 in lower-left key group 16 and Arrow keys 31 and 32 in lower-right key group 17 have no function relative to selection of the Field or Load displayed on upper display area 12. These Arrow keys are used to adjust calibration factors for measured data which is displayed on lower display areas 13 and 14.

Figure 3:
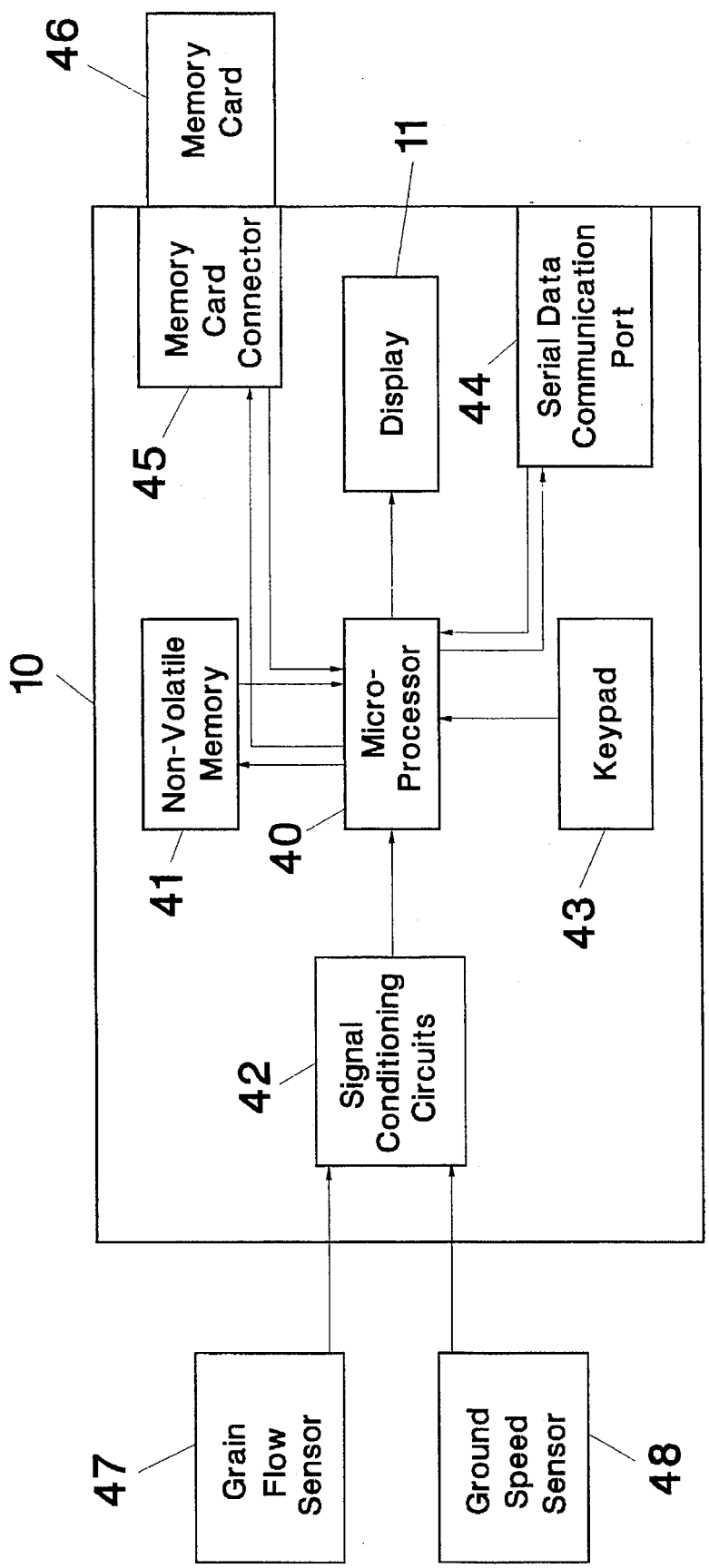
FIG. 3 is a block diagram representation of a complete yield monitoring system utilizing the monitor of FIGS. 1–2.

FIG. 3 shows a block diagram of a complete yield monitoring system utilizing monitor 10 if FIGS. 1–2. A digital processing unit such as micro-processor 40, typically with 8 bit or 16 bit data width and with integral analog-to-digital conversion capability, controls all input, output and internal operations of the monitor. Grain flow sensor 47 and ground speed sensor 48 provide signals representative of grain flow and harvester travel speed. Signal conditioning circuits 42 convert the raw signals from the sensors into voltage levels which can be fed directly into the micro-processor. The micro-processor also reads input signals from keypad 43, which is used by the operator to select the Field and Load which is being used for data collection or display, and sends signals to display 11 to display the selected data values.

Data which is recorded and computed for all Loads is stored in a digital memory device 41, which is of a non-volatile type so that data is retained in the absence of power applied to the monitor. The monitor also has power supply circuitry which is not shown in FIG. 3, but which supplies power for all of the monitor's internal circuits and the external sensors. Memory card connector 45 is built into monitor 10 to allow connecting removable memory card 46, typically a 68 pin PCMCIA standard type card, to the monitor. Micro-processor 40 has the capability to copy part or all of the contents of memory 41 to the memory card, or vice-versa. The micro-processor may also record data simultaneously in both memory 41 and memory card 46.

After data has been transferred to or collected directly onto memory card 46, the card can be removed and inserted into a memory card drive on a personal computer, so that data collected by monitor 10 can be loaded into programs for printing summaries or for further data analysis. By adding the appropriate electrical interface to monitor 10, it is also possible to utilize other types of removable memory devices, such as the magnetic disks which are commonly used with personal computers.

Monitor 10 also contains serial data communication port 44, through which the microprocessor can both send and recieve digitally encoded data. By connecting port 44 to a compatible communication port on a personal computer, the contents of memory 41 can be transferred to the computer, or vice-versa, through the serial port connection and without the use of memory card 46. Port 44 my also be used to allow a portable personal computer installed in the harvester to continuously receive data from monitor 10 and store large amounts of data which cannot be stored within internal memory 41 of the monitor. By continuously recording grain flow data in this manner, and by also linking the personal computer to a navigation device, it is possible to record grain yield for every location within a field.

Figure 4:
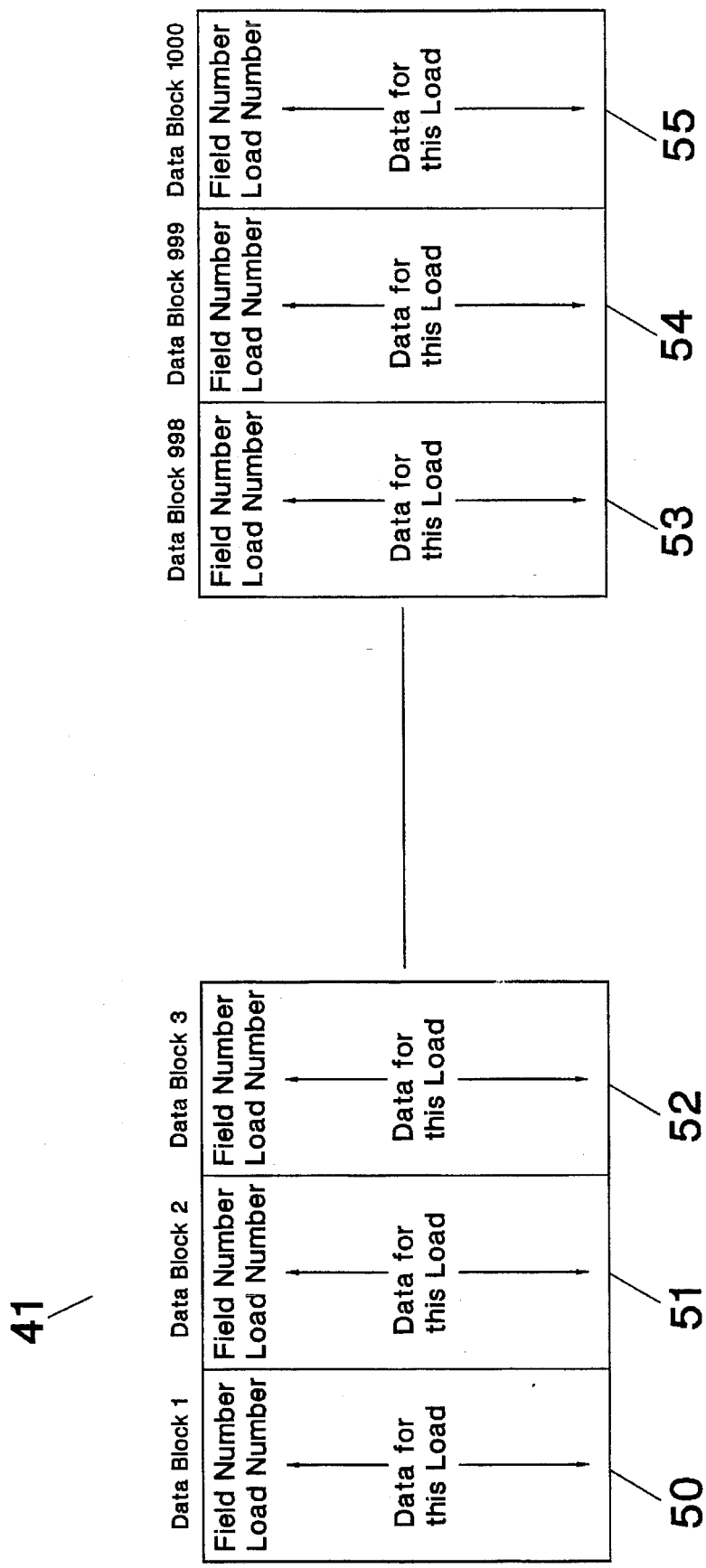
FIG. 4 is a block diagram representation of the partitioning of the memory contained within the monitor of FIGS. 1–2.

FIG. 4 shows a block diagram illustrating storage of data in memory 41 for each Load which is harvested. Memory 41, which is typically of 128 kilobytes or larger capacity, is partitioned into a large number, typically about 1000, of equally sized data blocks, such as blocks 50-52 at the start of the memory and blocks 53-55 at the end of the memory. A data block is created for each Load which is harvested. When a new Load is started within an existing Field, both the Field number and a new Load number are stored in that block, to identify its contents. When a new Field is started, a data block is assigned for Load 1 of the new Field, and the Field number and the Load number are stored to identify it. The remaining memory locations in each of the data blocks are used to store data which is recorded or computed for the particular Load of a given Field.

When the operator selects display of data for a particular Load of the currently selected Field, the micro-processor searches the memory locations where Field and Load numbers are stored, to find the data block associated with that load. If it finds the selected load number, it then retrieves and displays data from the appropriate data block. If it does not find the requested load number, it displays the START NEW LOAD? message on display 11.

When the operator selects display of data for a particular Field, the micro-processor searches memory 41 to find all of the data blocks identified with that Field number. If it finds one or more data blocks for the selected Field, it computes and displays field totals for the data values currently selected for display. If the micro-processor does not find any data blocks associated with the selected Field number, it displays the START NEW FIELD? message on display 11.

Table 1 shows a table of data which has been transferred from monitor 10 to a personal computer and printed. This data represents only a small fraction of a typical agricultural producer's harvest for a given year. The extensive data on individual Loads available from this summary, and the calculation of Field totals and averages, illustrates the benefits of utilizing a monitor having the capability to store a large amount of hierarchally organized data.

The foregoing description has illustrated the preferred embodiment of the present invention. However, it should be recognized that many variations of the keypad and display configurations are possible. For example, it is possible to combine the FIELD and LOAD keys into one, where successive keypresses of a FIELD/LOAD key toggle between selection of the Field level and the Load level of the hierarchy. Although less convenient for the operator, it would also be possible to combine all of the separate display areas described into one, so that only one selected item could be displayed at a time.

The foregoing description has illustrated the present invention as applied to a yield monitoring system for grain harvesters. However, it is anticipated that the invention has application in any type of monitoring or control system where storage of or access to hierarchal data is useful.

The foregoing description of the preferred embodiments of the present invention has been presented to illustrate a practical realization of the subject invention. It is not intended to be exhaustive or to limit the invention to the precise form disclosed. Other embodiments are possible without departing from the scope of the invention, and it is intended that the scope of the invention be limited only by the claims appended hereto.

TABLE 1

| FIELD 12 C-20 CORN | | | | | | | | | | |
|---|---|---|---|---|---|---|---|---|---|---|
| Load | | | Lbs Grain | | | Wet Bushels | | | Dry Bushels | | Max |
| # | Name | Date | Lb | % Err | Acres | Bu | Bu/Ac | Moist | Bu | Bu/Ac | Bu/Ac |
| 1 | 4159X | 10-19 | 29897 |  | 3.922 | 533.8 | 136.0 | 22.5 | 489.6 | 124.8 | 191 |
| 2 | 4159-MS | 10-19 | 13740 | +0.2 | 1.288 | 245.3 | 190.3 | 22.5 | 225.0 | 174.6 | 203 |
| 3 |  | 10-24 | 16698 |  | 1.638 | 298.1 | 181.9 | 18.5 | 287.6 | 175.5 | 179 |
| 4 |  | 10-24 | 14698 |  | 1.640 | 262.4 | 160.0 | 18.5 | 253.1 | 154.3 | 190 |
| 5 |  | 10-24 | 13836 |  | 1.617 | 247.0 | 152.7 | 18.5 | 238.3 | 147.3 | 163 |
| 6 | 4485 | 10-24 | 12336 |  | 1.637 | 220.2 | 134.5 | 20.8 | 206.4 | 126.1 | 183 |
| 7 | 4159 | 10-24 | 28840 | +0.1 | 3.196 | 515.0 | 161.1 | 22.4 | 472.9 | 147.9 | 204 |
| 8 | 4485 | 10-24 | 12586 |  | 1.632 | 224.7 | 137.6 | 22.8 | 205.3 | 125.7 | 165 |
| 9 | 4485 | 10-24 | 29843 |  | 4.172 | 532.9 | 127.7 | 20.1 | 503.9 | 120.7 | 162 |
| 10 |  | 10-27 | 77071 |  | 10.607 | 1376.2 | 129.7 | 20.0 | 1302.9 | 122.8 | 163 |
| 11 |  | 10-27 | 33557 |  | 4.857 | 599.2 | 123.3 | 20.0 | 567.3 | 116.7 | 153 |
| 12 |  | 10-27 | 15041 |  | 2.069 | 268.5 | 129.7 | 20.0 | 254.2 | 122.8 | 168 |
|  |  |  | 298143 |  | 38.280 | 5324.0 | 139.0 | 20.5 | 5006.9 | 130.7 |  |

| FIELD 13 C-29 CORN | | | | | | | | | | |
|---|---|---|---|---|---|---|---|---|---|---|
| Load | | | Lbs Grain | | | Wet Bushels | | | Dry Bushels | | Max |
| # | Name | Date | Lb | % Err | Acres | Bu | Bu/Ac | Moist | Bu | Bu/Ac | Bu/Ac |
| 1 | 4485 | 10-19 | 5264 |  | 0.639 | 94.0 | 147.0 | 20.0 | 88.9 | 139.2 | 165 |
| 2 | HT7728 | 10-19 | 7004 |  | 0.636 | 125.0 | 196.5 | 20.0 | 118.4 | 186.1 | 206 |
| 3 | HT650A | 10-19 | 6354 |  | 0.634 | 113.4 | 178.7 | 20.0 | 107.4 | 169.2 | 185 |
| 4 | 4502 | 10-19 | 5662 |  | 0.632 | 101.1 | 159.8 | 20.0 | 95.7 | 151.3 | 163 |
| 5 | GH2544 | 10-19 | 6348 |  | 0.634 | 113.3 | 178.6 | 20.0 | 107.3 | 169.1 | 190 |
| 6 | 4165X | 10-19 | 5379 |  | 0.630 | 96.0 | 152.3 | 20.0 | 90.9 | 144.2 | 155 |
| 7 | P3394 | 10-19 | 5874 |  | 0.633 | 104.9 | 165.6 | 20.0 | 99.3 | 156.8 | 182 |
| 8 | 4485 | 10-19 | 5572 |  | 0.633 | 99.5 | 157.0 | 20.0 | 94.2 | 148.6 | 181 |
| 9 | 4490 | 10-19 | 6230 |  | 0.635 | 111.2 | 174.9 | 20.0 | 105.3 | 165.6 | 184 |

I claim:

1. Apparatus for collecting and displaying data from a monitor of an agricultural machine, comprising:
   means for collecting said data from a specific geographic territory;
   data memory means for storing said data in an organized format including at least two hierarchal levels;
   a display which is divided into at least two display area;
   a digital processing unit interconnected with said display;
   a keypad for providing instructions to said digital processing unit to select the data shown on said display areas; and
   wherein said keypad has groups of keys associated with each of said display areas, for control of said associated display areas.

2. Apparatus as defined in claim 1, wherein the data entries within each hierarchal level are organized into data blocks which are labeled with a data group identifier that is displayed on a first of said at least two display areas with the corresponding hierarchal level and wherein a second of said at least two display areas shows a data entry from the corresponding data block.

3. Apparatus as defined in claim 1 wherein said hierarchal levels comprise fields and loads which are harvested by a grain harvester.

4. Apparatus as defined in claim 1, further comprising means for storing the hierarchal data on a portable memory means.

5. Apparatus as defined in claim 1, further comprising means for transferring the heirarchal data to an external data storage apparatus through a serial data communication port.

6. Apparatus as defined in claim 1, wherein keys are provided on said keypad for selection of said hierarchal level and for selection of particular data groups within said hierarchal level.

7. Apparatus as defined in claim 1, wherein said data memory means is portioned into a plurality of data blocks, each data block containing information identifying said block both individually and as part of a higher level hierarchal group.

8. Apparatus for collecting and displaying data from a monitor of a grain harvester, the apparatus comprising:
   data memory means for storing said data in an organized format including at least one data block with a hierarchal field level and a hierarchal load level;
   a digital processing unit;
   a data group identifier for each data block in each of the hierarchal load and field levels and accessible to said digital processing unit;
   a display interconnected with said digital processing unit and which is divided into at least two display areas;
   a keypad for providing instructions to said digital processing unit to select the data shown on said display areas;
   a group of keys of said keypad associated with each of said display areas for control of said associated display area; and
   a first of said at least two display areas capable of displaying a selected one of said hierarchal load or field level and said data group identifiers corresponding to said selected level and a second of said at least two display areas capable of displaying a selected data entry from said data blocking corresponding to said selected level.

9. Apparatus as defined in claim 8, wherein said field level corresponds to a specific geographic area from which grain has been harvested by the harvester.

10. A method for collecting and displaying data from a monitor of a grain harvester, comprising the steps of:
    collecting the data regarding the grain harvested from a specific geographic area;
    organizing the data into at least one data block with a hierarchal level corresponding to said specific geographic area and a hierarchal level corresponding to each load of the harvester for said specific geographic area;
    providing a digital processing unit;
    labeling each data block in each of said hierarchal levels with a group identifier accessible to said digital processing unit;
    displaying said data on a display interconnected to said digital processing unit, wherein said display is divided into at least two display areas;
    providing instructions to said digital processing unit from a keypad which includes a group of keys associated with each of said display areas; and
    controlling the display of the data on said display areas by the use of said keys.

11. A method as defined in claim 10, wherein the data entries within each hierarchal level are organized into data blocks which are labeled with a data group identifier that is displayed on a first of said at least two display areas with the corresponding hierarchal level and wherein a second of said at least two display areas shows a data entry from the corresponding data block.

12. A method as defined in claim 10, further comprising the step of transferring the hierarchal data to an external data storage apparatus.

13. A method as defined in claim 10, wherein said step of providing instructions includes selecting a hierarchal level for display on a display area and selecting at least one data group within said selected hierarchal level.

14. A method as defined in claim 10, wherein said step of organizing the data includes identifying each of said data blocks individually and as a part of a higher level hierarchal group.

* * * * *